UNITED STATES PATENT OFFICE.

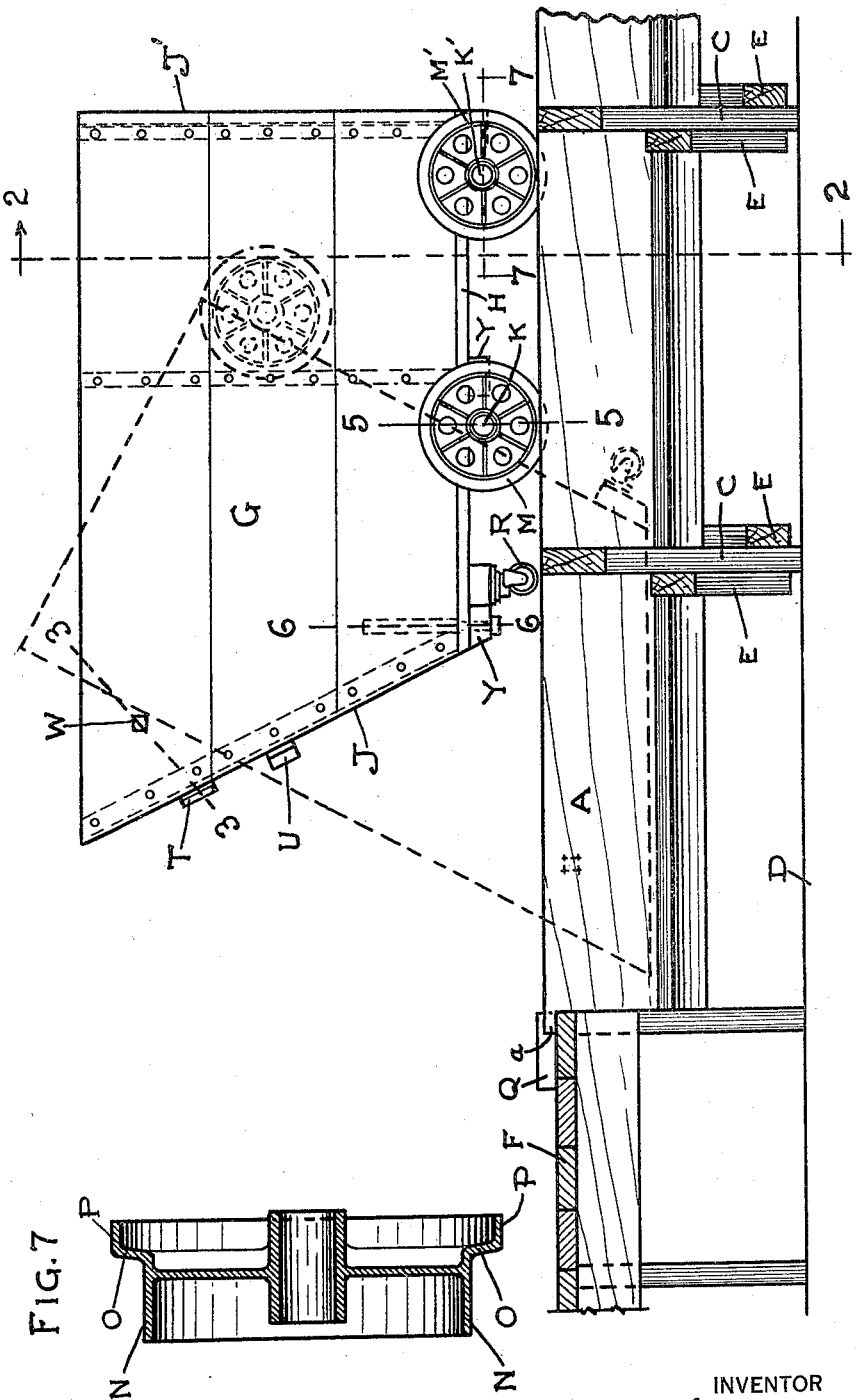

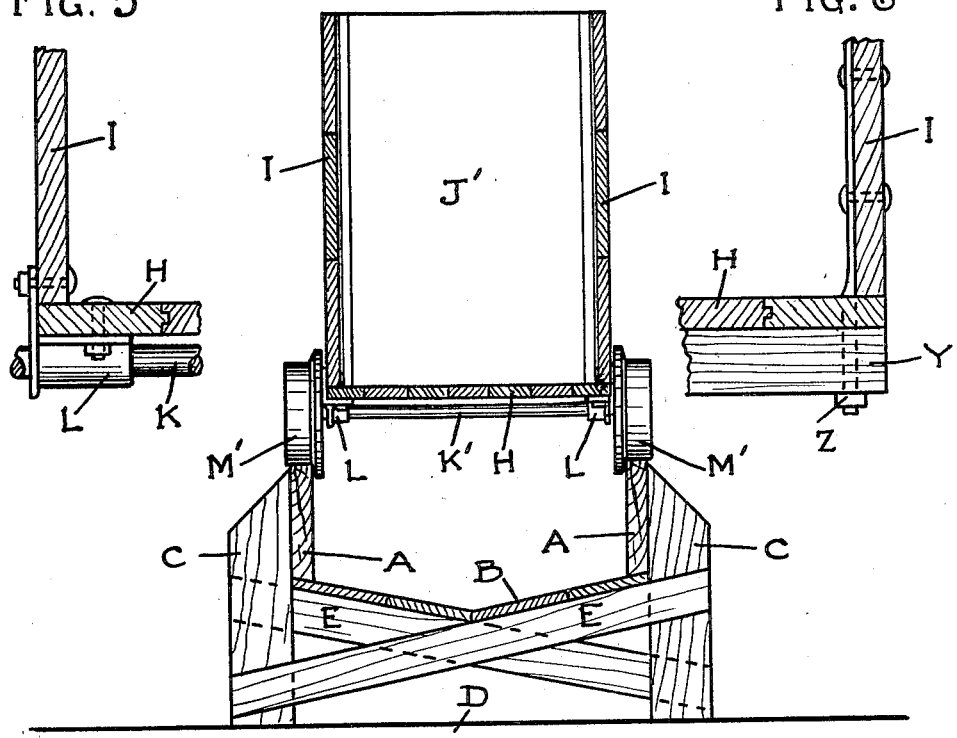

IVAR MATTSON, OF FAIRFIELD, IOWA.

ANIMAL-FEEDING DEVICE.

1,398,336.

Specification of Letters Patent.   Patented Nov. 29, 1921.

Application filed April 27, 1921. Serial No. 464,983.

*To all whom it may concern:*

Be it known that I, IVAR MATTSON, a citizen of the United States, residing at Fairfield, in the county of Jefferson and State of Iowa, have invented a new and useful Improvement in Animal-Feeding Devices, of which the following is a specification.

My invention relates to a feed truck designed to run along an extended feed trough or bunk designed to support the truck, so that the feed contained in the receptacle, with which the truck is provided, may be distributed along the trough or bunk as desired by the operator, and it consists of an adjustment of the wheels of the truck with relation to the receptacle whereby the feed therein may be easily and expeditiously dumped into the trough while the truck is being run along track-ways thereover. Also, of a further combination and adjustment of parts whereby the wheels of the truck will be adapted to also run on a level floor and the receptacle will be prevented from being dumped thereon, and of other improved features which will be set forth in the specification and claims.

In the accompanying drawings which form a part of the specification, Figure 1 is a side view of a feed truck mounted on a section of a feed trough which is connected at one end to a portion of a feed-house floor, the structure therein shown embodying my invention. Fig. 2 is a transverse section on line 2—2 of Fig. 1, looking in the direction of the arrows. Fig. 3 is an enlarged section on line 3—3 of Fig. 1. Fig. 4 is a plan view of a section of the feed-house floor adjoining the upper edges of the feed trough.

Figs. 5 and 6 are also enlarged sections on lines 5—5 and 6—6 of Fig. 1 which will be fully described later on. Fig. 7 is an enlarged diametrical section of one of the wheels of the truck as indicated by lines 7—7 of Fig. 1.

Referring to the drawings A represents the sides and B the bottom of an extended feed-trough or bunk, which sides and bottom are supported in position by a series of vertically disposed timbers C set in the ground D, and by cross-braces E secured to said timbers. At one end the trough is connected to the floor of a feed-house or silo, as indicated by F, the feed-house or silo not being shown. The truck is adapted to run on the floor F as well as along the feed-trough, and is provided with a rectangular shaped receptacle G having a bottom H, sides I, front end J and back end J'.

To lower portions of the receptacle, preferably the bottom H, axles K and K' are secured as shown by clips L in Fig. 5 (which is a transverse section of a portion of one side of the receptacle G and a portion of the axle K), and on the outwardly projecting ends of the axles two pairs of wheels M and M' are mounted. It will be seen that the sides A of the trough are extended up to form track-ways for the wheels M and M' to run upon, and the wheels are so spaced and otherwise fitted to run upon these track-ways. As shown by the enlarged section of one of the wheels in Fig. 7, they are provided with wide treads N to run on the upper edges of the side-pieces A and with flanges O extended outwardly at approximately right angles to the axles K and K' to hold the wheels in place on the track-ways A. The outer edges of the flanges O instead of continuing at approximately right angles to the axles are deflected inwardly so as to extend in circles substantially parallel with the axles.

By this means secondary treads P are formed of larger diameters than the treads N. The object of these secondary treads is to run on the floor F, and as will be seen by Fig. 1, the upper edges of parts A constituting the track-ways for the wheels over the trough are set enough higher to correspond with the outstanding widths of the flanges O. In this way, the main treads N will be in line with the upper edges of the track-ways A, while the secondary treads P will be in line with the floor F and the truck will therefore pass easily and without jar from the floor to the track-ways and vice versa. If it was attempted to use ordinary flanged wheels for this purpose by making the flanges the proper widths to reach the floor, the flanges would either cut recesses in the floor or they would have to be made so extremely thick and heavy that it would make the wheels extremely clumsy and expensive to manufacture. The flanges P can be extended to form any desired widths of secondary tread without adding materially to the weight of the wheels.

In order to guide the wheels of the feed-truck more certainly from the floor F on to the track-ways A it is advisable to taper the adjacent ends of the trackways outwardly as indicated by a in Fig. 4, and also to nail a couple of cleats Q with their inner ends pointing inwardly also as shown in Fig. 4. By this arrangement the wheels of the feed-truck will be easily guided on to the track-ways and the danger of their running off will be prevented.

It will be observed by an inspection of Fig. 1 that the axle K and the wheels M mounted on the ends of said axle are located much nearer to the central meridian line of the receptacle G than the axle K' and wheels M'. The object of this arrangement is to assist in dumping the feed. The location of these axles and wheels is designed to be such that the normal position of the truck, as shown by the full lines in Fig. 1, will be maintained while the truck is being run along the track-ways on the upper edges of the trough but that a slight downward impulse on the part of the operator applied to the front end of the receptacle will cause it to assume the dumped position shown by the dotted lines, the wheels M' being lifted bodily off the track-way and the entire truck turning of the pivot of the axle K. By this means the very least possible effort is required to dump the truck and at the same time it may be run along the track-ways in its normal upright position without material danger of being prematurely upset.

It is desirable that the truck should be dumped to distribute the feed in the trough but it would be objectionable for the truck to be dumped and spill the feed on the floor. To provide against this contingency I place a small caster wheel R under the end of the receptacle next to the axle K so that when passing over the floor this wheel will come in contact with the floor before the truck can be tilted sufficiently to cause it to dump. While this arrangement will prevent the truck from being dumped on the floor it will not interfere in the least with its dumping into the trough. Other means which will contact with the floor and prevent dumping if the truck should be slightly tilted may be used to secure this result but I consider the caster wheel preferable for this purpose.

The rear end J' may be disposed at substantially right angles to the bottom H of the receptacle, but it is preferable that the front end J be set sloping, as shown in Fig. 1, so that when the receptacle is dumped it will be in substantial line with the bottom of the feed-trough, as shown by dotted lines, thus facilitating the deposit of the feed in the trough. It is also preferable that this end be made slidable so that it may be taken out or opened slightly at the bottom to release a small amount of feed. To accomplish this result I place angle irons S on the insides of these ends of the sides I and place the end J inside of these angle irons as plainly shown in Fig. 3. To hold the end in place I use two or more keepers T which are secured to the outside of the member J so as to catch over the outer sides of the angles S. The end J may also be provided with a handle U to assist in sliding it up and down on the angles S.

In handling the truck the operator walks in the trough and takes hold of the front end of the receptacle and dumps the feed as he pushes the truck along the track-ways. This is the most expeditious plan but the operator has to walk in the feed in the trough. By pushing the loaded truck to the outer end of the trough and then dumping the feed as he pulls it back the operator will avoid walking on the feed. The projecting upper edge of the sloping front end of the receptacle gives the operator additional leverage in handling the truck.

To hold these ends of the sides I together I use a pipe V through which and also through adjacent openings in the sides I a bolt W is passed, which when drawn tight will securely hold the sides in position. To adjust the distance of the sides apart to suit the requirements of the slidable member J, I insert one or more washers X, between the ends of the pipe and the sides I. By putting in or taking out washers the distance can be varied so that the slidable member J will neither be too tight nor too loose. Fig. 6 is an enlarged transverse section of a common plan of connecting the sides and bottom of a box by means of a cleat Y and bolt Z, which may be used to advantage in the construction of the receptacle. The entire device or combination of devices is extremely simple and inexpensive to construct, also easily and expeditiously manufactured and is decidedly effective in operation.

What I claim is:

1. In animal feeding devices, the combination of an extended feed-trough having track-ways on its upper edges, a feed truck having a rectangularly shaped receptacle, and two pairs of wheels adapted to run on the track-ways journaled on lower portions of said receptacle, one pair of the wheels being journaled near the meridian line of the receptacle and the other pair of wheels being journaled near to one end of the receptacle, whereby the truck will be nearly balanced when resting on all the wheels and a slight downward pull on the extended end of the receptacle next to the central wheels will cause it to tip downward and dump the receptacle into the trough.

2. In animal feeding devices, the combination of an extended feed-trough having track-ways on its upper edges, a feed truck having a rectangularly shaped receptacle, a pair of axles affixed to the bottom of the receptacle, one axle near its meridian line and the other axle near one of the ends of the receptacle, and two pairs of wheels mounted on the outstanding ends of the axles, whereby the truck will be nearly balanced when resting on all of the wheels and a slight downward pull on the extended end of the receptacle next the central wheels will cause the receptacle to tilt on the central axle as a pivot and to dump it into the trough.

3. In animal feeding devices, the combination of an extended feed-trough having track-ways on its upper edges, a feed truck having a rectangularly shaped receptacle, with one of its ends made sloping to form an extended upper edge, and two pairs of wheels adapted to run on the track-ways journaled on lower portions of said receptacle, one pair of the wheels being journaled near the meridian line of the receptacle and the other pair of wheels being journaled near to one end of the receptacle, whereby the truck will be nearly balanced when resting on all the wheels and a slight downward pull on the extended end of the receptacle next to the central wheels will cause it to tip downward and dump the receptacle into the trough, and the sloping end of the receptacle will be substantially in line with the bottom of the trough.

4. In a device of the character described, the combination of an extended feed-trough and a feed-truck having wheels adapted to run on the upper edges of the feed trough, the trough comprising a series of vertically disposed spaced apart timbers set in a suitable foundation, side boards secured to the sides of the timbers and extended up to form track-ways for the wheels of the feed-truck to run upon, joists extended across from the timbers on one side to the timbers on the other and bottom boards secured to said joists.

5. In a device of the character described, the combination of an extended feed-trough and a feed-truck having wheels adapted to run on the upper edges of the feed trough, the trough comprising a series of vertically disposed spaced apart timbers set in a suitable foundation, side boards secured to the sides of the timbers and extended up to form track-ways for the wheels of the feed-truck to run upon, pairs of joists extended across on opposite sides of the timbers on one side at an angle to the adjacent sides of the timbers on the other side so as to cross each other near their centers, and bottom boards secured to the joists whereby the bottom of the trough will slope downward from the sides of the trough to the center.

6. In a device of the character described, the combination of an extended feed trough having track-ways on its upper edges, a feed-floor adjoining one end of the feed-trough, and a feed-truck with wheels having main treads adapted to run on the track-ways, and secondary treads of larger diameter adapted to run on the feed-floor, the track-ways being set higher than the feed-floor to equalize the difference between the radii of the main and secondary treads.

7. In a device of the character described, the combination of an extended feed-trough having track-ways on its upper edges, a feed-floor adjoining one end of the feed-trough, and a feed-truck with wheels having main treads adapted to run on the track-ways, flanges on the wheels to run along the inner sides of the track-ways, and the outer portions of flanges being deflected inwardly on a circular line parallel with the journals upon which the wheels are mounted and thus form secondary treads adapted to run upon the feed-floor.

8. In a device of the character described, the combination of an extended feed-trough having track-ways on its upper edges, a feed floor adjoining one end of the feed-trough, and a feed-truck with wheels having main treads adapted to run on the track-ways, and secondary treads of larger diameter adapted to run on the feed-floor, the track-ways being set higher than the feed-floor to equalize the difference between the radii of the main and secondary treads, the ends of the track-ways being extended a short distance over the edge of the feed-floor and being beveled on their inner sides, and cleats secured to the floor between the track-ways with their inner ends inclined together and spaces between their outer ends and the track-ways to admit the secondary treads between them whereby the wheels of the truck will be guided from the feed-floor onto the track-ways.

9. In a device of the character described, the combination of an extended feed-trough having track-ways on its upper edges, a feed truck having wheels adapted to run on the track-ways and a receptacle with a sloping end and an extended upper edge, angle irons applied on the inner edges of said sloping end, a slidable end member placed on the inner sides of said angles, and keepers applied to the outer sides of the ends of said member adjacent to the angles so as to catch over the outer sides of the angles and hold the end member in slidable position on the angles.

10. In a device of the character described, the combination of an extended feed trough having track-ways on its upper edges and a floor connected to one end of said track-ways, a feed truck adapted to run on said track-ways and to be dumped into the trough, and also to run on the floor, and means on said truck to come in contact with the floor should it be slightly tilted to prevent the truck from being dumped thereon, but not to interfere with the dumping of the truck into the trough.

11. In a device of the character described, the combination of an extended feed trough having track-ways on its upper edges and a floor connected to one end of said trackways, a feed truck adapted to run on said track-ways and to be dumped into the trough, and also to run on the floor, and a caster wheel on said truck to come in contact with the floor should it be slightly tilted to prevent the truck from being dumped thereon, but not to interfere with the dumping of the truck into the trough.

12. In a device of the character described, the combination of an extended feed trough having track-ways on its upper edges, a feed-truck provided with a receptacle adapted to run on the track-ways and at one end to be dumped into the feed-trough, the dumpable end of the receptacle being provided with a slidable member, a piece of tubing slightly shorter than the distance between the sides of the receptacle next the slidable member, a bolt passed through the tubing and through holes in the sides of the receptacle adjoining the ends of the tubing, and one or more washers placed between the ends of the tubing and the sides of the receptacle, whereby loosening the bolt and putting in or taking out washers the distance between the sides of the receptacle may be widened or narrowed to suit the side of the slidable member.

Fairfield, Iowa, April 25th, 1921.

IVAR MATTSON.